Patented Aug. 18, 1925.

1,549,942

UNITED STATES PATENT OFFICE.

EDWIN C. WHITE, OF BALTIMORE, MARYLAND.

MERCURY DERIVATIVES OF PHTHALEIN AND METHOD OF PREPARING SAME.

No Drawing. Application filed July 26, 1921, Serial No. 487,685. Renewed January 5, 1925.

*To all whom it may concern:*

Be it known that I, EDWIN C. WHITE, a citizen of the United States, residing at Baltimore, in the State of Maryland, have invented certain new and useful Improvements in Mercury Derivatives of Phthaleins and Methods of Preparing Same, of which the following is a specification.

It is known that by the action of mercuric chlorid or other soluble salts of mercury in excess on solutions of salts of phthaleins, di-mercury derivatives can be prepared, such di-derivatives being the exclusive products of the reaction. If mercuric chlorid be used the resulting products are chloro-mercury compounds of the type

each mercury atom being bound to carbon by one valence and to chlorin by the other.

The present invention relates to halogen-free mono-mercury derivatives of phthaleins, in which, it is believed, the mercury is bound by one valence to carbon and by the other to a hydroxyl group. Such compounds are decidedly less toxic than the halogen-containing derivatives previously described.

My novel compounds may be prepared by boiling the solution of a soluble salt, usually a sodium salt, of a phthalein with the molecular equivalent of freshly precipitated yellow oxid of mercury until the latter is dissolved; freeing the solution of any traces of mercury or mercurous oxid which may have been formed; and then evaporating the clear solution to dryness, preferably under reduced pressure to avoid overheating.

In the specific case of phenolphthalein the solution of the mercurated salt is unstable; it is therefore regarded as preferable to precipitate the free mercurated phenolphthalein by carbon dioxid, and to filter, wash and dry the precipitate, which may then be re-dissolved by means of sodium hydroxid.

The term "phthalein" is employed in the specification and claims to include not only non-substituted phthaleins, but such substituted phthaleins as have at least one free position ortho to the phenol-hydroxyl group, or to the quinone group in case the phthalein exists in the quinoid or colored modification; such for example as phenolphthalein; ortho-cresol-phthalein, thymolphthalein, fluorescein, methyl fluorescein, gallein, phenolsulfonphthalein, cresolsulfonphthalein, thymolsulfonphthalein and the like.

*Example I.*—3.18 grams of phenolphthalein are dissolved in 25 c. c. of normal sodium hydroxid solution, diluted to 150 c. c., and boiled with 2.16 grams of freshly precipitated yellow mercuric oxid for 3–4 hours. After removing the small amount of gray precipitate, the mercurated phenolphthalein is precipitated by carbon dioxid in the form of a purplish white, curd-like body. This precipitate is then re-dissolved in the minimum proportion of sodium hydroxid solution.

*Example II.*—20 c. c. of normal sodium hydroxid solution are heated with 3.5 grams of fluorescein, which is slightly in excess of the amount that will dissolve, thus precluding the presence of any excess alkali. After diluting to about 125 c. c., 2.2 grams of yellow oxid of mercury are added and the mixture is boiled until it appears clear, which requires about ½ hour. The small amount of gray precipitate formed is removed by centrifuging, and the resulting solution is evaporated to dryness, preferably under reduced pressure and at as low a temperature as practicable. The product appears in the form of green scales or granules readily soluble in water.

*Example III.*—3.5 grams of phenolsulfonphthalein are dissolved in 10 c. c. of normal sodium hydroxid solution, diluted to about 100 c. c. and boiled with 2.2 grams of yellow mercuric oxid until the latter is dissolved. This requires 4 to 6 hours. After removing the small amount of finely divided gray precipitate, as in the previous example, the solution is evaporated to dryness in the same manner as in Example II. The product is a dark reddish brown scale or powder, readily soluble in water. Before use of solutions of this substance for injection, dilute sodium hydroxid is added until a distinct purple color just appears. This provides a suitable degree of alkalinity.

The products prepared as above are useful for purposes of injection as anti-syphilitic agents.

I claim:—

1. The hereindescribed process comprising reacting with mercuric oxid in aqueous suspension on a soluble salt of a phthalein.

2. The hereindescribed process comprising reacting with mercuric oxid in aqueous suspension on the sodium salt of fluorescein.

3. The hereindescribed novel product having therapeutic properties, consisting essentially of a halogen-free alkali-metal salt of a mono-mercury derivative of a phthalein.

4. The hereindescribed novel product having therapeutic properties, consisting essentially of a halogen-free alkali-metal salt of a mono-mercury derivative of ffuorescein.

5. The hereindescribed process of preparing halogen-free mercury compounds of phthaleins which comprises mixing freshly precipitated oxid of mercury with a solution of a soluble salt of a phthalein and boiling the mixture.

In testimony whereof, I affix my signature.

EDWIN C. WHITE.